（12） United States Patent
Akishino et al.

(10) Patent No.: US 11,692,847 B2
(45) Date of Patent: Jul. 4, 2023

(54) ILLUMINATING APPARATUS AND ILLUMINANCE COLLECTION SYSTEM

(71) Applicant: TOYOTA JIDOSHA KABUSHIKI KAISHA, Aichi-ken (JP)

(72) Inventors: Ryota Akishino, Toyota (JP); Hiroki Saito, Toyota (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 96 days.

(21) Appl. No.: 17/453,655

(22) Filed: Nov. 5, 2021

(65) Prior Publication Data
US 2022/0244071 A1 Aug. 4, 2022

(30) Foreign Application Priority Data

Feb. 1, 2021 (JP) .................................. 2021-014622

(51) Int. Cl.
G01C 21/00 (2006.01)
B60W 40/02 (2006.01)
G01C 3/08 (2006.01)
G01J 1/42 (2006.01)

(52) U.S. Cl.
CPC ......... G01C 21/3807 (2020.08); B60W 40/02 (2013.01); G01C 3/08 (2013.01); G01C 21/3848 (2020.08); G01J 1/42 (2013.01); B60W 2420/40 (2013.01); B60W 2555/20 (2020.02); G01J 2001/4266 (2013.01)

(58) Field of Classification Search
CPC .. G01C 21/3807; G01C 21/3848; G01C 3/08; B60W 40/02; B60W 2555/20; B60W 2420/40; G01J 1/42; G01J 2001/4266
See application file for complete search history.

(56) References Cited

U.S. PATENT DOCUMENTS

2020/0307578 A1* 10/2020 Magolan ............... B60W 20/00
2021/0403015 A1* 12/2021 Kato ....................... G08G 1/16

FOREIGN PATENT DOCUMENTS

JP 2017181089 A 10/2017

* cited by examiner

Primary Examiner — Tyler J Lee
Assistant Examiner — Yufeng Zhang
(74) Attorney, Agent, or Firm — Hauptman Ham, LLP

(57) ABSTRACT

An illuminating apparatus includes an illuminance sensor mounted on a vehicle and configured to detect an illuminance outside the vehicle as a detected illuminance, a location sensor mounted on the vehicle and configured to detect a location of the vehicle as a detected location, and a controller configured to store one or more illuminance thresholds that are thresholds of the illuminance and monitor whether there is a crossover phenomenon that the detected illuminance crosses one of the one or more illuminance thresholds. The controller is configured to transmit crossing data, including information indicating the detected location when the crossover phenomenon occurs and information indicating the detected illuminance when the crossover phenomenon occurs, to a management apparatus outside the vehicle.

10 Claims, 13 Drawing Sheets

FIG. 13

| | FIRST COMBINATION | | SECOND COMBINATION | |
| --- | --- | --- | --- | --- |
| | FIRST MODE | SECOND MODE | FIRST MODE | SECOND MODE |
| TRANSMISSION TIMING | WHEN THRESHOLD IS CROSSED | PERIODICALLY | WHEN THRESHOLD IS CROSSED | WHEN THRESHOLD IS CROSSED |
| TRANSMISSION DATA | LOCATION ILLUMINANCE | LOCATION ILLUMINANCE | LOCATION ILLUMINANCE | LOCATION ILLUMINANCE TRAVEL ROUTE |

ILLUMINATING APPARATUS AND ILLUMINANCE COLLECTION SYSTEM

CROSS-REFERENCE TO RELATED APPLICATION

This application claims priority to Japanese Patent Application No. 2021-014622 filed on Feb. 1, 2021, incorporated herein by reference in its entirety.

BACKGROUND

1. Technical Field

The specification describes an illuminating apparatus that provides a management apparatus with an illuminance according to a vehicle location, and an illuminance collection system that includes a plurality of illuminating apparatuses and a management apparatus.

2. Description of Related Art

In recent years, mounting a solar cell capable of generating electric power by using sunlight on a vehicle or a portable electronic device, such as a cellular phone, has been suggested. Such a vehicle or a portable electronic device is able to efficiently obtain electric power by passing through a place where the illuminance is high. Hitherto, a technique for generating a sunshine map showing the distribution of illuminance and providing information on a place suitable for photovoltaic power generation to a vehicle or the like by consulting the sunshine map has been suggested.

For example, Japanese Unexamined Patent Application Publication No. 2017-181089 (JP 2017-181089 A) describes an apparatus that calculates a sunshine percentage of each of a plurality of travel routes based on weather information, solar orbit information, and three-dimensional map information and that provides a vehicle with the travel route of which the sunshine percentage is the highest. In JP 2017-181089 A, the vehicle includes an illuminance sensor. When the vehicle determines that the current location of the vehicle is not in the sunshine based on a detected result of the illuminance sensor, the vehicle makes a request of the above-described apparatus for a travel route running in the sunshine.

SUMMARY

However, when the sunshine percentage is calculated based on weather information, solar orbit information, and three-dimensional map information as described in JP 2017-181089 A, the amount of calculation is enormous. In addition, a divergence may occur between information on buildings recorded in a map and information on real buildings depending on the frequency of update of the three-dimensional map information, which leads to deterioration of the accuracy of calculating a sunshine percentage.

For this reason, instead of estimating an illuminance at each location by calculation, it is conceivable to detect an illuminance at each location with the use of an illuminance sensor. Most of vehicles include an illuminance sensor for the purpose of, for example, controlling the on timing of lights, or the like. It is also conceivable that a management apparatus capable of communicating with such vehicles is provided, the management apparatus collects data of illuminances respectively detected by the illuminance sensors of a large number of vehicles, and the management apparatus generates a sunshine map based on the collected data. With this configuration, a divergence between the generated sunshine map and a real sunshine distribution is reduced. However, with this configuration, to generate a sunshine map with some degree of accuracy, each vehicle is required to transmit the data of illuminance at relatively high frequency, which leads to a significant increase in communication traffic.

The specification describes an illuminating apparatus capable of providing a management apparatus with sufficient data required to generate a sunshine map while suppressing communication traffic between a vehicle and the management apparatus, and an illuminance collection system including the illuminating apparatus.

An illuminating apparatus described in the specification includes an illuminance sensor mounted on a vehicle and configured to detect an illuminance outside the vehicle as a detected illuminance, a location sensor mounted on the vehicle and configured to detect a location of the vehicle as a detected location, and a controller configured to store one or more illuminance thresholds that are thresholds of the illuminance and monitor whether there is a crossover phenomenon that the detected illuminance crosses one of the one or more illuminance thresholds. The controller is configured to transmit crossing data, including information indicating the detected location when the crossover phenomenon occurs and information indicating the detected illuminance when the crossover phenomenon occurs, to a management apparatus outside the vehicle.

The crossing data is data indicating a boundary point of an area that belongs to one illuminance level. The management apparatus is able to acquire a large number of boundary points of an area that belongs to one illuminance level by obtaining crossing data from a plurality of illuminating apparatuses and is able to obtain a boundary line of the area that belongs to the one illuminance level by connecting the boundary points. When such a boundary line is obtained, a sunshine map can be generated even when there is no data of illuminance at an intermediate location of an area. In other words, with the above configuration that transmits crossing data, it is not required to transmit data of illuminance at an intermediate location of an area. As a result, with the above configuration, while communication traffic between the vehicles and the management apparatus is reduced, sufficient data required to generate a sunshine map can be provided to the management apparatus.

In this case, the controller may be configured to transmit the crossing data to the management apparatus when no new crossover phenomenon occurs until a prescribed default time elapses or until the vehicle travels a prescribed default distance, after the crossover phenomenon occurs, and the controller may be configured not to transmit the crossing data to the management apparatus when a new crossover phenomenon occurs before the default time elapses or before the vehicle travels the default distance, after the crossover phenomenon occurs.

With the above configuration, temporary illuminance fluctuations are ignored, so communication traffic between the vehicles and the management apparatus is further reduced.

When illuminance fluctuations that the crossover phenomenon frequently occurs over a prescribed default frequency arise, the controller may be configured to transmit, to the management apparatus, fluctuation data, including a fluctuation start location that is the detected location at a start of the illuminance fluctuations and a fluctuation end location that is the detected location at an end of the illuminance fluctuations.

An area in which a crossover phenomenon frequently occurs is regarded an area inappropriate for photovoltaic power generation. With the above configuration, the management apparatus is able to learn a boundary location of such an area inappropriate for photovoltaic power generation.

The controller may be configured to, after transmitting data of illuminance to the management apparatus, a prescribed standby time elapses or intermediate report timing at which the vehicle has travelled a prescribed standby distance is reached without newly transmitting data, transmit, to the management apparatus, the detected location at a time point of the intermediate report timing and a representative value of the detected illuminance obtained before the intermediate report timing or the detected illuminance at the time point of the intermediate report timing.

With the above configuration, the management apparatus is able to learn not only an illuminance at a boundary of an area but also an illuminance at an intermediate location, so the accuracy of a sunshine map is further improved.

The illuminating apparatus may further include a raindrop sensor mounted on the vehicle and configured to detect a raindrop on a windshield. The crossing data may include a detected result of the raindrop sensor when the crossover phenomenon occurs.

With the above configuration, the management apparatus is able to estimate the cause of a change in illuminance to some extent.

The crossing data may further include a travel route of the vehicle from when the crossover phenomenon occurs last time to when the crossover phenomenon occurs current time.

With the above configuration, the management apparatus is able to learn not only an illuminance at a boundary of an area but also an illuminance at an intermediate location, so the accuracy of a sunshine map is further improved.

The controller may be configured to operate in one operation mode selected according to a situation from among a plurality of operation modes, and the plurality of operation modes may include a first mode in which the controller transmits the crossing data when the crossover phenomenon occurs and a second mode in which the controller transmits a larger amount of data of illuminance than in the first mode.

The amount and details of data required to generate a sunshine map depend on a situation, particularly, the density of vehicles equipped with the illuminating apparatus. With the above configuration, the amount and details of data to be transmitted to the management apparatus can be changed according to a situation. As a result, the management apparatus is able to appropriately generate a sunshine map even when a situation changes.

The controller may be configured to select one operation mode from among a plurality of operation modes based on at least one of a time period, a vehicle location, and an instruction from the management apparatus.

With the above configuration, the controller is able to operate in an appropriate operation mode.

An illuminance collection system described in the specification may include a plurality of illuminating apparatuses respectively mounted on vehicles, and a management apparatus configured to manage data of illuminance, transmitted from the plurality of illuminating apparatuses. Each of the plurality of illuminating apparatuses may include an illuminance sensor mounted on a vehicle and configured to detect an illuminance outside the vehicle as a detected illuminance, a location sensor mounted on the vehicle and configured to detect a location of the vehicle as a detected location, and a controller configured to store one or more illuminance thresholds that are thresholds of the illuminance and monitor whether there is a crossover phenomenon that the detected illuminance crosses one of the one or more illuminance thresholds. The controller is configured to transmit crossing data, including information indicating the detected location when the crossover phenomenon occurs and information indicating the detected illuminance when the crossover phenomenon occurs, to the management apparatus.

With the above configuration, while communication traffic between the vehicles and the management apparatus is reduced, a sunshine map is appropriately generated.

In this case, the management apparatus may be configured to perform mapping by classifying the detected locations included in the crossing data by the one or more crossed illuminance thresholds and generate a sunshine map divided according to illuminance level by connecting the detected locations associated with the same one of the one or more illuminance thresholds.

With the technique described in the specification, while communication traffic between the vehicles and the management apparatus is reduced, a sunshine map is appropriately generated.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 13 is a table showing an example of a combination of a first mode and a second mode.

DETAILED DESCRIPTION OF EMBODIMENTS

Figure 1:
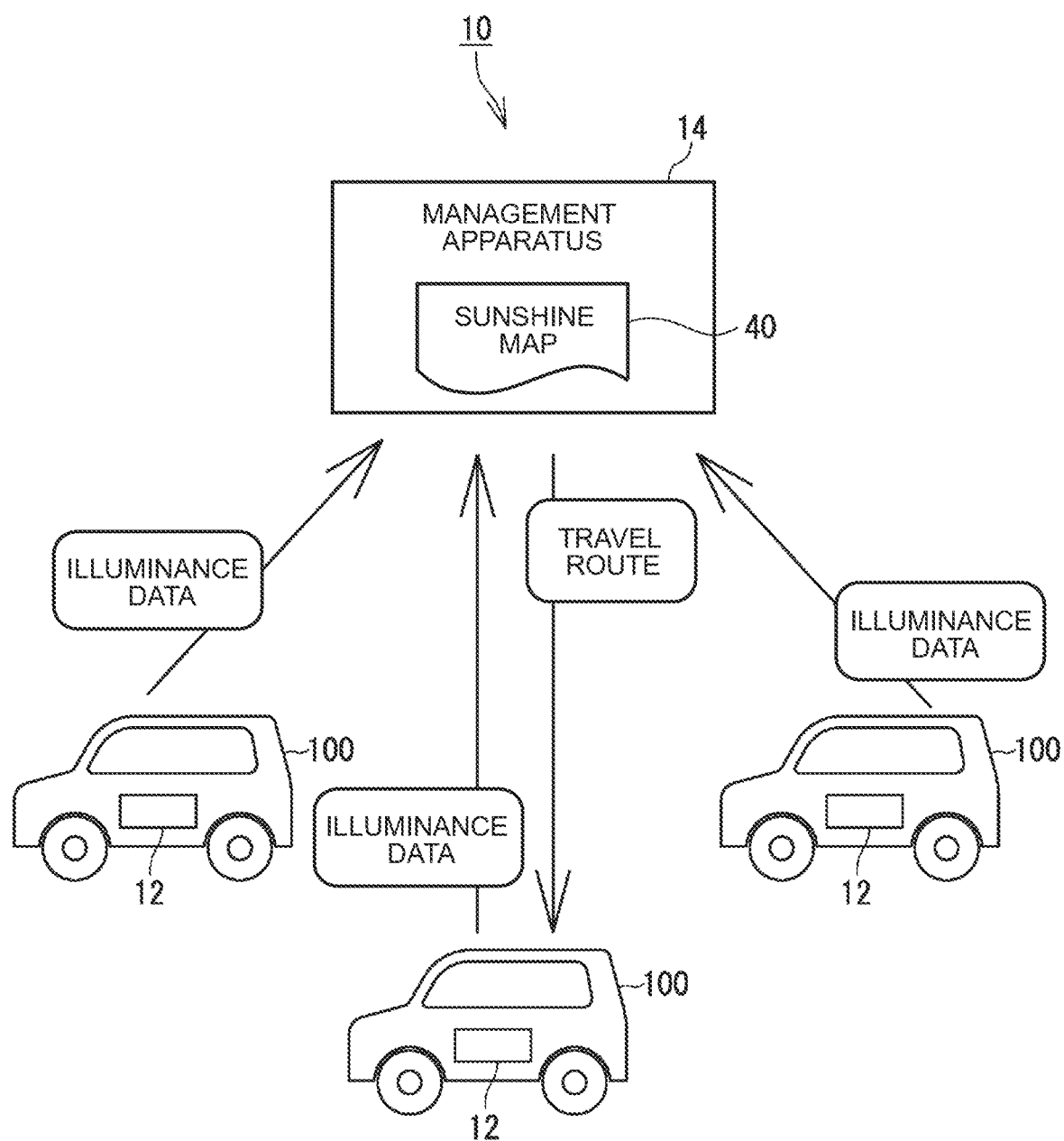
FIG. 1 is a conceptual view showing the configuration of an illuminance collection system.
Figure 2:
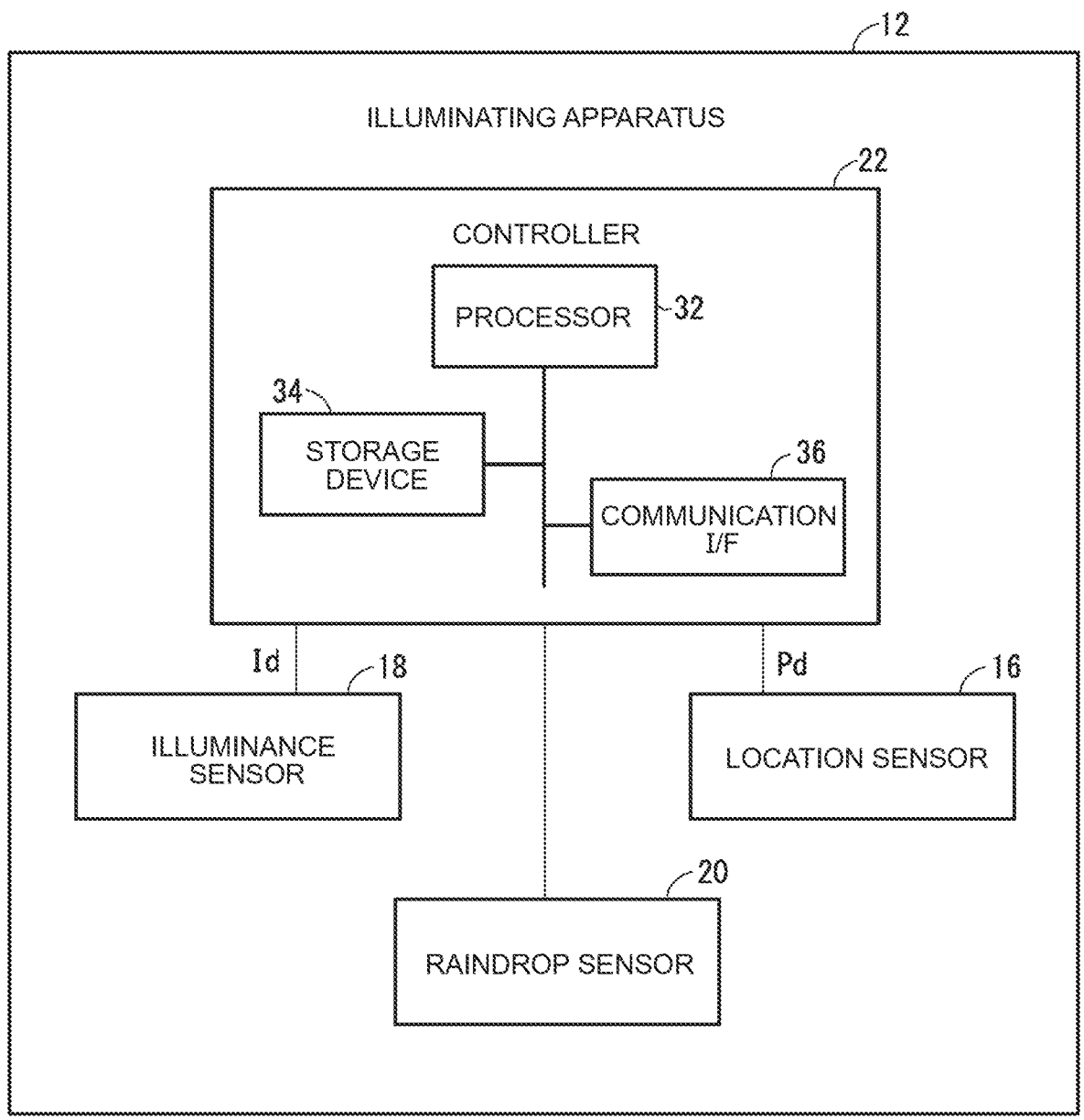
FIG. 2 is a block diagram showing the configuration of an illuminating apparatus.

Hereinafter, the configuration of an illuminance collection system 10 will be described with reference to the accompanying drawings. FIG. 1 is a conceptual view showing the configuration of the illuminance collection system 10. FIG. 2 is a block diagram showing the configuration of an illuminating apparatus 12.

The illuminance collection system 10 collects illuminances in various places and includes a management apparatus 14 and a plurality of the illuminating apparatuses 12. The management apparatus 14 receives data of illuminance (hereinafter, referred to as illuminance data) from the illuminating apparatuses 12 and manages the illuminance data. The management apparatus 14 generates a sunshine map 40 based on the collected illuminance data. The sunshine map 40 shows the distribution of illuminance. The sunshine map 40 may be used to, for example, provide information on places suitable for photovoltaic power generation to vehicles or portable electronic devices (for example, mobile terminals or the like) equipped with a solar cell. Therefore, when, for example, the management apparatus 14 receives a request from an electrically-powered vehicle equipped with a solar cell, the management apparatus 14 calculates a travel route, along which photovoltaic power generation is efficiently performed, based on the sunshine map 40 and provides the travel route to the electrically-powered vehicle. The management apparatus 14 is physically a computer including a processor, a storage device, and a communication I/F.

Each of the illuminating apparatuses 12 is mounted on a vehicle 100, detects the location of the vehicle 100 and the illuminance at the location, and transmits the illuminance to the management apparatus 14 as illuminance data. As shown in FIG. 2, the illuminating apparatus 12 includes a location sensor 16, an illuminance sensor 18, a raindrop sensor 20, and a controller 22.

The location sensor 16 is a sensor that detects the location of the illuminating apparatus 12 (by extension, the vehicle 100) and is, for example, a GPS. The location sensor 16 may be provided exclusively for the illuminating apparatus 12, or a location sensor originally mounted on the vehicle 100 may be used as the location sensor 16. A detected result by the location sensor 16 is output to the controller 22 as a detected location Pd.

The illuminance sensor 18 is a sensor that detects an illuminance outside the vehicle. The illuminance sensor 18 has a light receiving element made up of, for example, a photodiode, or the like and converts light incident to the light receiving element into an electrical signal. The illuminance sensor 18 may be provided exclusively for the illuminating apparatus 12, or an illuminance sensor originally mounted on the vehicle 100 may be used as the illuminance sensor 18. For example, the vehicle 100 includes lights required to be turned on in a dark environment, specifically, headlights, tail lights, and the like. To automatically turn on the headlights and the like, the vehicle 100 is equipped with an illuminance sensor called auto light sensor. An illuminance sensor used as an auto light sensor may be used as the illuminance sensor 18 used in the illuminating apparatus 12. An illuminance detected by the illuminance sensor 18 is output to the controller 22 as a detected illuminance Id together with a detected location Pd.

The raindrop sensor 20 is a sensor that detects whether there are raindrops on the windshield of the vehicle 100. The raindrop sensor 20 may be provided exclusively for the illuminating apparatus 12, or a raindrop sensor originally mounted on the vehicle 100 may be used as the raindrop sensor 20. For example, the vehicle 100 includes a raindrop sensor that detects the amount of raindrops to automatically adjust the windshield wiper speed according to the amount of rainfall. The raindrop sensor 20 used in the illuminating apparatus 12 may be a raindrop sensor provided for this auto wiper.

The controller 22 manages data detected by the various sensors 16, 18, 20 and, where necessary, transmits the data to the management apparatus 14. The controller 22 is physically a computer including a processor 32, a storage device 34, and a communication I/F 36. Examples of the computer include a microcontroller in which a computer system is incorporated in one integrated circuit. The processor 62 refers to a generalized processor. Examples of the processor 62 include general-purpose processors (for example, a central processing unit (CPU) and the like) and dedicated processors (for example, a graphics processing unit (GPU), an application specific integrated circuit (ASIC), a field programmable gate array (FPGA), a programmable logical device, and the like).

The storage device 34 may include at least one of a semiconductor memory (for example, a RAM, a ROM, a solid state drive, or the like) and a magnetic disk (for example, a hard disk drive, or the like).

The communication I/F 36 enables communication with various devices outside the vehicle 100. The communication I/F 36 may comply with multiple communication standards. Therefore, the communication I/F 36 may include a communication device that performs internet-based communication via, for example, a wireless LAN, such as Wi-Fi (registered trademark), or mobile data communication whose service provider is a cellular phone company or the like. The communication I/F 36 may include a communication device (antenna or the like) for DSRC (dedicated short range communication), which communicates with another vehicle or infrastructure equipment on a road without intervening the Internet. The illuminating apparatus 12 exchanges various data with the management apparatus 14 via the communication I/F 36.

The controller 22, where necessary, transmits data of illuminance (that is, illuminance data) to the management apparatus 14. Here, to improve the accuracy of the sunshine map 40 generated by the management apparatus 14, the more amount of illuminance data to be transmitted from the illuminating apparatus 12 is preferable. However, when a large amount of illuminance data is transmitted from the illuminating apparatus 12 to the management apparatus 14 at high frequency, communication traffic increases, so this may adversely affect communication lines. On the other hand, when the frequency of communication of illuminance data is merely decreased, this leads to another inconvenience that the accuracy of the sunshine map 40 decreases.

For this reason, in the illuminating apparatus 12 described in the specification, to achieve both a reduction of communication traffic and improvement in the resolution of the sunshine map 40, the controller 22 compares a detected illuminance Id with a plurality of prestored illuminance thresholds Th1, Th2, Th3, Th4 and transmits data of illuminance to the management apparatus 14 according to the compared result. Hereinafter, this will be described in detail.

The controller 22 stores the illuminance thresholds Th1, Th2, Th3, Th4 that are thresholds of illuminance. Illuminances are grouped into a plurality of illuminance levels L0, L1, L2, L3, L4 by the illuminance thresholds Th1, Th2, Th3, Th4. Hereinafter, when the four illuminance thresholds Th1, Th2, Th3, Th4 are not distinguished from one another, the suffix numbers are replaced with "*" and are written as illuminance thresholds Th*. For the five illuminance levels L0, L1, L2, L3, L4 as well, when the levels are not distinguished from one another, the levels are written as illuminance levels L*.

Figure 3:
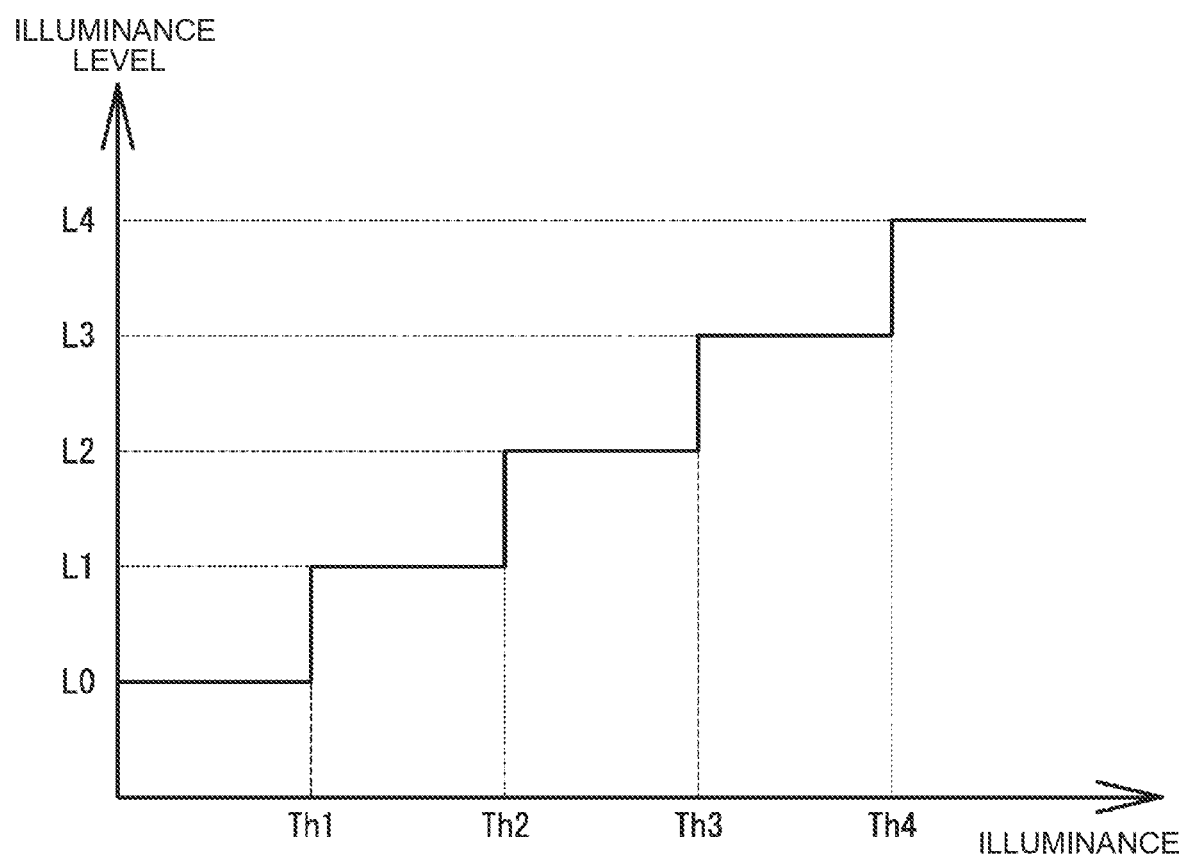
FIG. 3 is a conceptual view showing the relationship between illuminance threshold and illuminance level, stored in a controller.

FIG. 3 is a conceptual view showing the relationship between illuminance threshold Th* and illuminance level L*, stored in the controller 22. In FIG. 3, the abscissa axis represents illuminance, and the ordinate axis represents illuminance level L*. As shown in FIG. 3, the illuminance level is L0 when the illuminance is lower than the illuminance threshold Th1, the illuminance level is L1 when the illuminance is higher than or equal to the illuminance threshold Th1 and lower than the illuminance threshold Th2, the illuminance level is L2 when the illuminance is higher than or equal to the illuminance threshold Th2 and lower than the illuminance threshold Th3, the illuminance level is L3 when the illuminance is higher than or equal to the illuminance threshold Th3 and lower than the illuminance threshold Th4, and the illuminance level is L4 when the illuminance is higher than or equal to the illuminance threshold Th4.

The illuminance sensor 18 detects an illuminance and outputs the illuminance to the controller 22 as a detected illuminance Id at every predetermined sampling timing. The controller 22 compares the detected illuminance Id with the illuminance thresholds Th*. The controller 22 monitors whether the detected illuminance Id crosses one of the illuminance thresholds Th*. Hereinafter, the phenomenon that the detected illuminance Id crosses one of the illuminance thresholds Th* is termed crossover phenomenon. When, for example, a detected illuminance Id[i] at one sampling timing is lower than the illuminance threshold Th1 and a detected illuminance Id[i+1] obtained at the next sampling timing is higher than or equal to the illuminance threshold Th1, the controller 22 determines that a crossover phenomenon has occurred. In the following description, the detected location Pd when a crossover phenomenon occurs is referred to as crossing location Pt, and the crossed threshold is referred to as crossing threshold Tht.

When a crossover phenomenon occurs, the controller 22 transmits crossing data to the management apparatus 14. Crossing data is a type of illuminance data and includes information indicating a detected location Pd when a crossover phenomenon occurs and information indicating a detected illuminance Id when a crossover phenomenon occurs.

Here, the information indicating a detected location Pd when a crossover phenomenon occurs may be a detected location Pd, that is, the very crossing location Pt, when a crossover phenomenon occur or may be a value obtained by processing the crossing location Pt. The information indicating a detected illuminance Id when a crossover phenomenon occurs may be, for example, an illuminance threshold Th* that a detected illuminance Id crosses, that is, a crossing threshold Tht. Instead of such a crossing threshold Tht, the information indicating a detected illuminance Id when a crossover phenomenon occurs may be the value of a detected illuminance Id or illuminance level L* just before, just after, or just before and just after the crossing threshold Tht is crossed.

In any case, crossing data includes information on a location and an illuminance at the time of occurrence of a crossover phenomenon. The crossing data may be regarded as data indicating the boundary of an area that belongs to one illuminance level L*. Crossing data may further include other information in addition to information indicating an illuminance and a location. For example, crossing data may include a crossing direction indicating whether the detected illuminance Id crosses the crossing threshold Tht in an upward direction or in a downward direction. Crossing data may include information indicating the traveling direction of the vehicle 100 when the detected illuminance Id crosses the crossing threshold Tht. When the crossing data includes a crossing direction and a traveling direction, which side is lower than the crossing threshold and which side is higher than or equal to the crossing threshold with respect to the crossing location Pt can be learned.

Figure 4:
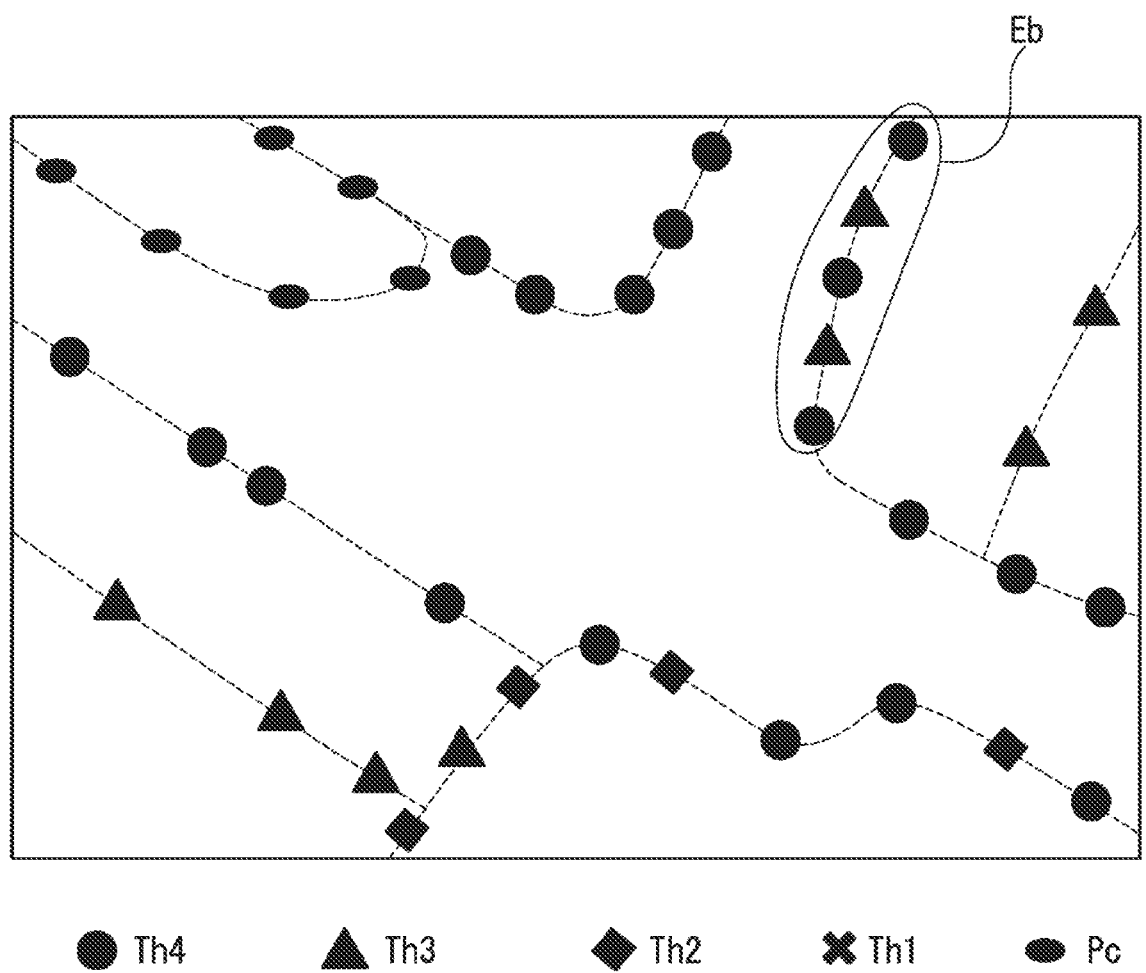
FIG. 4 is a graph showing an example of a result of mapping crossing data by a management apparatus.

The management apparatus 14 classifies and maps crossing locations Pt included in crossing data transmitted from a large number of the illuminating apparatuses 12 by crossing threshold Tht. FIG. 4 is a graph showing an example of a result of mapping crossing data by the management apparatus 14. In FIG. 4, the solid circle represents a crossing location Pt when the illuminance threshold Th4 is crossed, the solid triangle represents a crossing location Pt when the illuminance threshold Th3 is crossed, the solid diamond represents a crossing location Pt when the illuminance threshold Th2 is crossed, and the cross mark represents a crossing location Pt when the illuminance threshold Th1 is crossed. The boundary lines of areas divided by illuminance level L* are obtained by connecting the crossing locations Pt associated with the same illuminance threshold Th*. For example, in the case of FIG. 4, the boundary line of the area of the illuminance level L4 is obtained by connecting the solid circles. Similarly, the boundary line between the area of the illuminance level L3 and the area of the illuminance level L2 is obtained when the solid triangles are connected, the boundary line between the area of the illuminance level L2 and the area of the illuminance level L1 is obtained when the solid diamonds are connected, and the boundary line between the area of the illuminance level L1 and the area of the illuminance level L0 is obtained when the cross marks are connected.

In a process flow of the present embodiment that will be described later, two different crossing locations Pt appear on the boundary line between two areas of which the illuminance levels L* are different by two or more steps. For example, as in the case of area Eb in FIG. 4, the crossing locations Pt associated with the illuminance threshold Th4 (solid circles) and the crossing locations Pt associated with the illuminance threshold Th3 (solid triangles) appear on the boundary line between the area of the illuminance level L4 and the area of the illuminance level L2. This is because the moving direction of the illuminating apparatus 12 that provides the crossing locations Pt to the management apparatus 14 is different. In other words, in the process flow of the present embodiment, the illuminating apparatus 12 having moved from the area of the illuminance level L4 to the area of the illuminance level L2 provides the crossing threshold Tht associated with the illuminance threshold Th3 (solid triangle) to the management apparatus 14, and the illuminating apparatus 12 having moved from the area of the illuminance level L2 to the area of the illuminance level L4 provides the crossing location Pt associated with the illuminance threshold Th4 (solid circle) to the management apparatus 14. Therefore, the management apparatus 14 allows a boundary line associated with one illuminance threshold Th* (for example, L3) to overlap a boundary line associated with another illuminance threshold Th* (for example, Th4).

Figure 5:
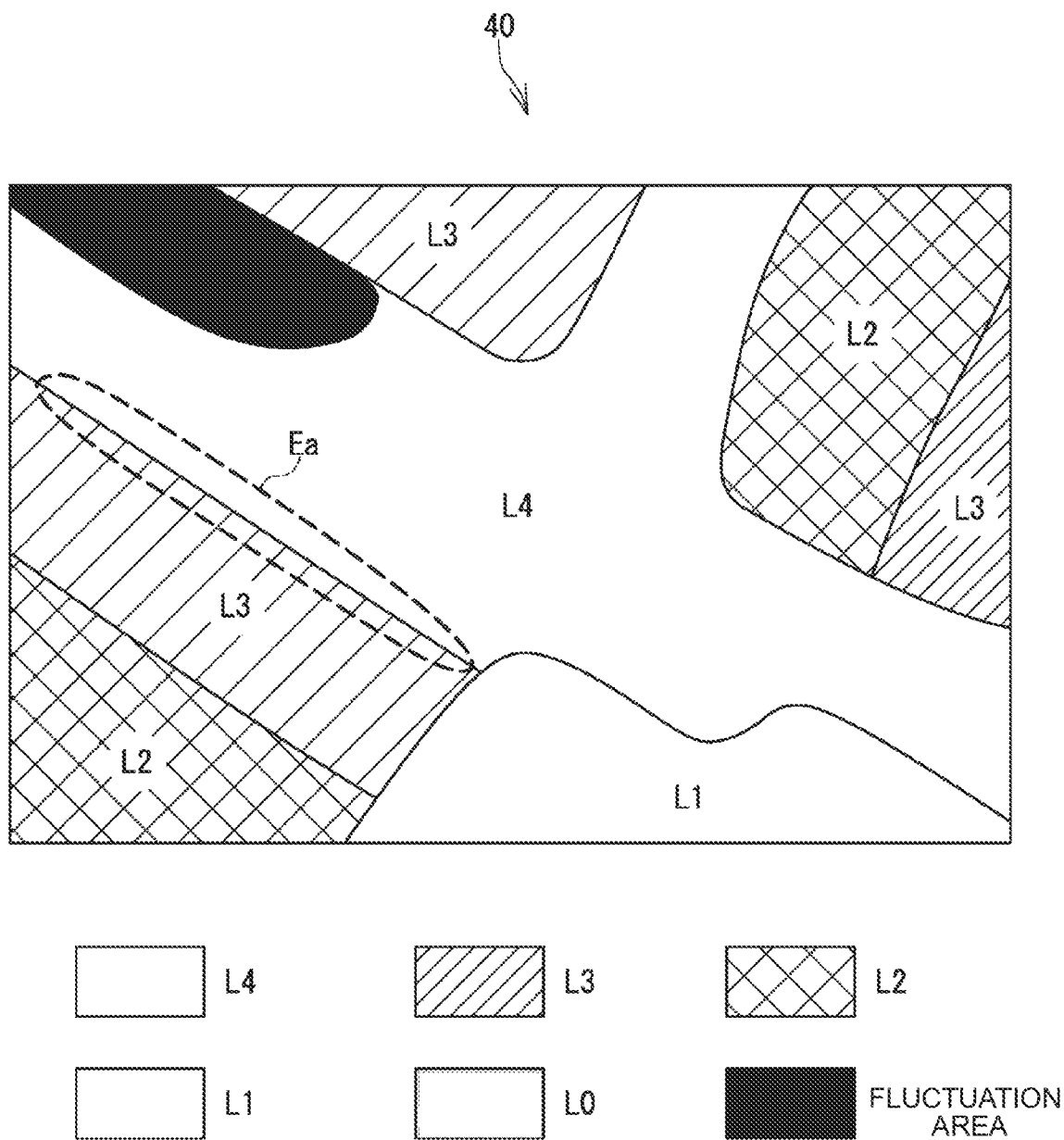
FIG. 5 is a view showing an example of a sunshine map generated from the result of mapping shown in FIG. 4.

The management apparatus 14 generates a sunshine map 40 by assigning the illuminance level L* to an area surrounded by the boundary line. FIG. 5 is a view showing an example of the sunshine map 40 generated from the result of mapping shown in FIG. 4. In this way, by transmitting crossing data, that is, data indicating boundaries between areas divided by illuminance level L*, from the illuminating apparatuses 12 to the management apparatus 14, a sunshine map 40 with a sufficient resolution is generated while communication traffic between the illuminating apparatuses 12 and the management apparatus 14 is suppressed.

Figure 6:
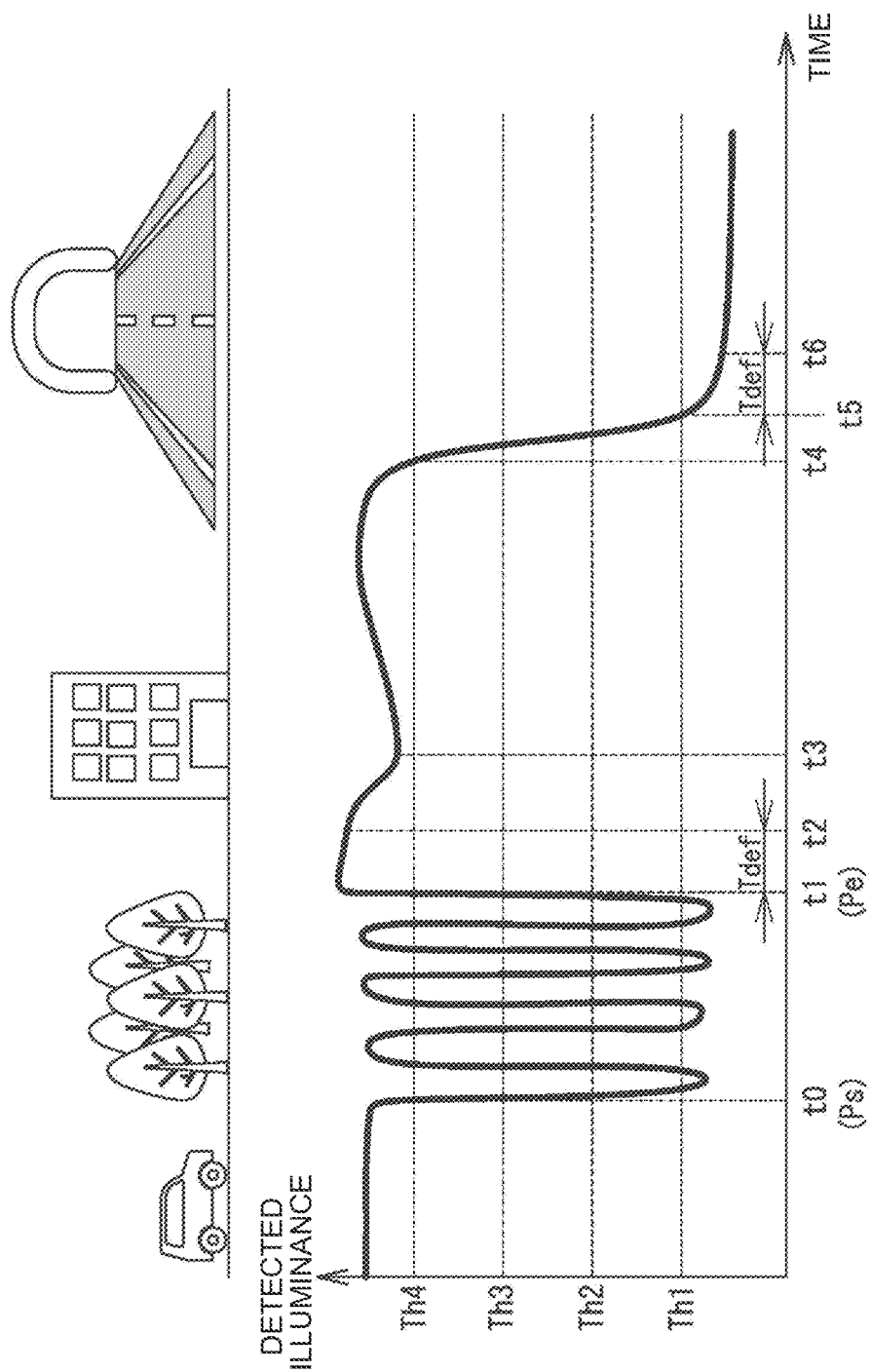
FIG. 6 is a graph showing an example of a change in illuminance.

Even when crossing data is transmitted each time a crossover phenomenon occurs, it almost may not contribute to improvement in the usability of the sunshine map 40. This will be described with reference to FIG. 6. FIG. 6 is a graph showing an example of a change in illuminance. In the example of FIG. 6, the vehicle 100 travels in order of urban area, forest, urban area, and tunnel.

In the first urban area, the detected illuminance Id is constantly higher than or equal to the illuminance threshold Th4. After that, the vehicle 100 travels in the forest from time t0 to time t1. In the forest, a sunshine area where the sunlight streaming through the leaves of trees and a shade area that is a shade of trees randomly appear, so the detected illuminance Id significantly fluctuates at short intervals. In other words, a crossover phenomenon that the detected illuminance Id crosses the illuminance threshold Th* repeatedly occurs at short intervals. On the other hand, macroscopically, in the forest, an average illuminance almost remains unchanged, and the illuminance also almost remains unchanged between the start (time t0) of fluctuations and the end (time t1) of fluctuations. In this way, an area in which the illuminance fluctuates in a vibration manner at short intervals but the illuminance level remains unchanged between the start of fluctuations and the end of fluctuations is referred to as fluctuation area in the following description. From the viewpoint of use in photovoltaic power generation, it makes almost no sense even when the boundary between bright and dark places in such a fluctuation area is obtained. On the other hand, in a fluctuation area, when crossing data is transmitted to the management apparatus 14 each time a crossover phenomenon occurs, communication traffic uselessly increases.

When the vehicle 100 exits the forest and enters the urban area, the detected illuminance Id becomes higher than or equal to the illuminance threshold Th4 again. When the vehicle 100 enters the tunnel at time t4, the detected illuminance Id steeply decreases and becomes less than the illuminance threshold Th1 at time t5. In other words, during a short time from time t4 to time t5, a crossover phenomenon that the detected illuminance Id crosses one of the illuminance thresholds Th4, Th3, Th2, Th1 occurs four times. To learn a steep decrease in illuminance, the last crossover phenomenon (that is, the phenomenon that Th1 is crossed) of the four crossover phenomena just needs to be obtained, and there is a little merit for the management apparatus 14 in learning the previous three crossover phenomena (that is, the phenomena that Th4, Th3, Th1 are crossed).

For this reason, the controller 22 presets a prescribed default time Tdef and transmits crossing data only when no new crossover phenomenon occurs until the default time Tdef elapses after a crossover phenomenon occurs. In other words, when a new crossover phenomenon occurs again before the default time Tdef elapses after a crossover phenomenon occurs, the controller 22 does not transmit crossing data. With this configuration, communication traffic from the illuminating apparatus 12 to the management apparatus 14 is further reduced.

Figure 7:
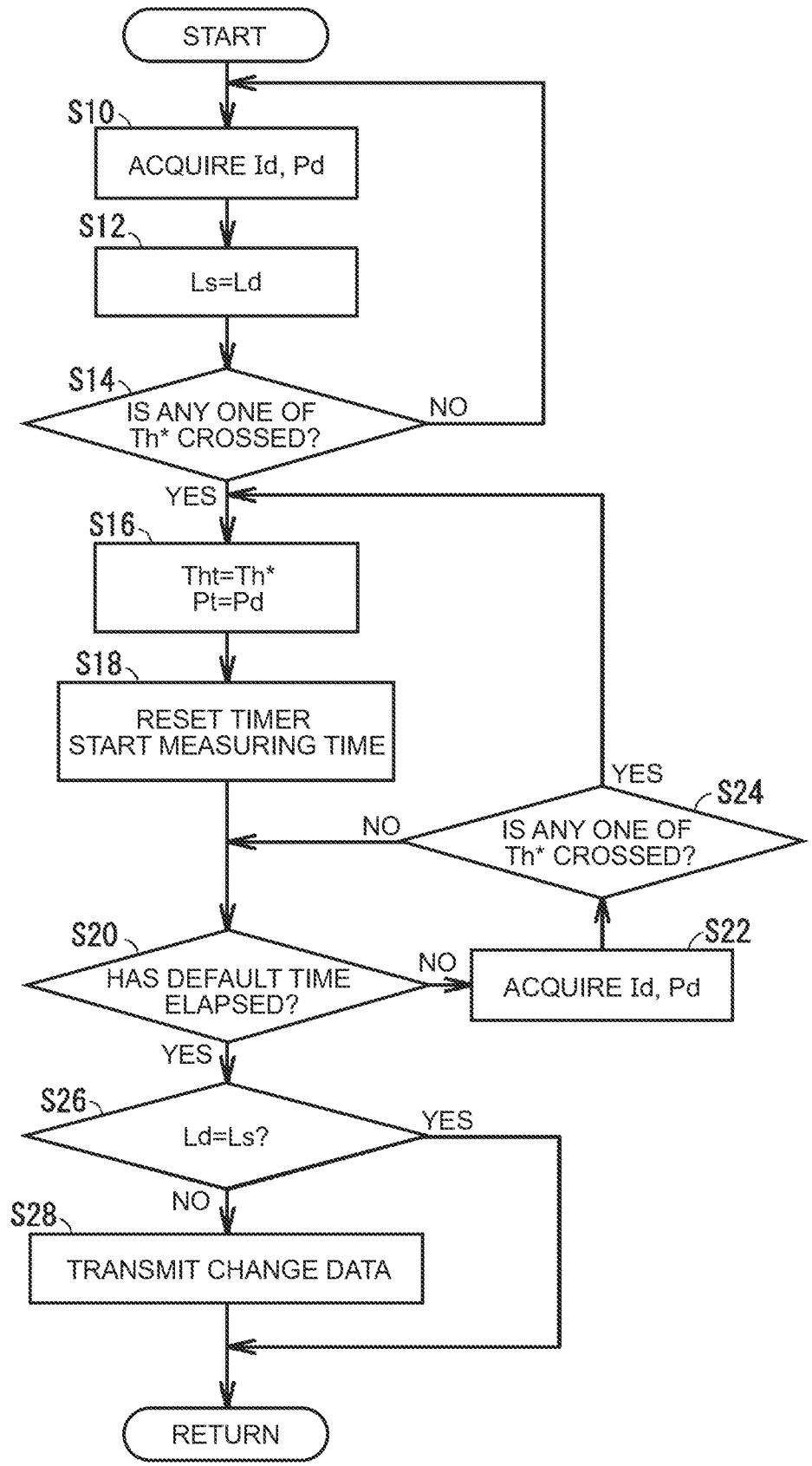
FIG. 7 is a flowchart showing the flow of a process of transmitting crossing data.

FIG. 7 is a flowchart showing the flow of a process of transmitting such crossing data. The controller 22 periodically acquires a detected illuminance Id and a detected location Pd (S10). The controller 22 identifies a current illuminance level L* (hereinafter, referred to as current illuminance level Ld) from the obtained detected illuminance Id and temporarily stores the current illuminance level Ld in the storage device 34 as a start illuminance level Ls (S12). A start illuminance level Ls is a parameter for distinguishing a fluctuation area as in the case of the period from time t0 to time t1 in FIG. 6 and a steep change area as in the case of the period from time t4 to time t5 from each other, and this will be described later. Subsequently, in step S14, each time a detected illuminance Id is obtained, the controller 22 compares the detected illuminance Id with the preset illuminance thresholds Th* and determines whether there is a crossover phenomenon (S14). When there is no crossover phenomenon (No in S14), the controller 22 returns to step S10 and repeats step S10 and step S12.

When the crossover phenomenon that the detected illuminance Id crosses any one of the illuminance thresholds Th* arises (Yes in S14), the controller 22 temporarily stores the crossed illuminance threshold Th* as a crossing threshold Tht and the detected location Pd at the crossing time point as a crossing location Pt in the storage device 34 (S16). Subsequently, the controller 22 resets a built-in timer (not shown) in the controller 22 and starts measuring an elapsed time with the timer (S18). The controller 22 compares the elapsed time with the default time Tdef (S20).

When the measured time is shorter than the default time Tdef (No in S20), the controller 22 acquires a detected illuminance Id and a detected location Pd again (S22) and monitors whether there is a crossover phenomenon (S24). When the crossover phenomenon that the detected illuminance Id crosses any one of the illuminance thresholds Th* arises (Yes in S24), the controller 22 returns to step S16, updates the crossing threshold Tht and the crossing location Pt, resets the timer, and starts time measurement again (S18). On the other hand, when no crossover phenomenon occurs (No in S24), the controller 22 repeatedly acquires a detected illuminance Id and a detected location Pd (S22) until the default time Tdef elapses. When the measured time becomes longer than or equal to the default time Tdef (Yes in S20), the controller 22 compares a current illuminance level Ld calculated from the latest detected illuminance Id with the start illuminance level Ls temporarily stored in the storage device 34 (S26). As a result of the comparison, when Ld≠Ls (No in S26), the controller 22 transmits crossing data including the temporarily stored crossing threshold Tht and crossing location Pt to the management apparatus 14 (S28). On the other hand, when Ld=Ls, the controller 22 determines that the latest crossover phenomenon is a crossover phenomenon due to a fluctuation area and returns to step S10 without transmitting crossing data.

Transmission of crossing data will be described with reference to FIG. 6 again. In accordance with the flowchart of FIG. 7, a crossover phenomenon occurs at time t0, and the controller 22 temporarily stores a detected location Pd at time t0 and the crossed illuminance threshold Th4 in the storage device 34 as a crossing location Pt and a crossing threshold Tht. The controller 22 temporarily stores the illuminance level L4 just before the first crossover phenomenon as a start illuminance level Ls in the storage device 34.

After time t0, a crossover phenomenon repeatedly occurs at intervals shorter than the default time Tdef. In accordance with the flowchart of FIG. 7, each time a crossover phenomenon occurs, the controller 22 updates the crossing location Pt and the crossing threshold Tht, stored in the storage device 34, while the controller 22 does not transmit crossing data to the management apparatus 14. At time t2 at which the default time Tdef has elapsed from time t1 at which the fluctuation area terminates, the controller 22 compares the illuminance level L4 at that time point (that is, the current illuminance level Ld) with the start illuminance level Ls stored in the storage device 34. In the case of the present embodiment, the current illuminance level Ld and the start illuminance level Ls each are L4 and the same. For this reason, in this case, step S26 of FIG. 7 is affirmative, so the controller 22 does not transmit crossing data at time t2.

When a crossover phenomenon occurs at time t4 as well, the controller 22 temporarily stores the illuminance level L4 just before the crossover phenomenon as a start illuminance level Ls in the storage device 34. On the other hand, after time t4, a crossover phenomenon occurs at intervals shorter than the default time Tdef until time t5. In this case, each time a crossover phenomenon occurs, the controller 22 updates the crossing location Pt and the crossing threshold Tht, stored in the storage device 34, but the controller 22 does not transmit crossing data to the management apparatus 14. At time t6 at which the default time Tdef has elapsed from time t5 at which a crossover phenomenon occurs last, the controller 22 compares the current illuminance level Ld=L0 with the start illuminance level Ls=L4 stored in the storage device 34. In this case, Ld≠Ls, so the controller 22 transmits crossing data including the crossing location Pt and the crossing threshold Tht, obtained in the latest crossover phenomenon (that is, the crossover phenomenon at time t5) to the management apparatus 14.

At time t3, the detected illuminance Id is slightly decreasing due to the shade or the like of a building; however, the detected illuminance Id does not cross any illuminance threshold Th*. For this reason, of course, crossing data is not transmitted to the management apparatus 14 at time t3 as well.

In other words, in accordance with the flowchart of FIG. 7, in the example of FIG. 6, crossing data is transmitted only once at time t6. In this way, although the number of times of transmission of crossing data is small, the crossing data indicates the boundary of areas divided by illuminance level L*. For this reason, the management apparatus 14 is able to sufficiently learn the areas divided by illuminance level L* and is able to generate a sunshine map 40 with a sufficient resolution. In other words, according to the present embodiment, while data communication traffic is reduced, a sunshine map 40 with a sufficient resolution is generated.

Figure 8:
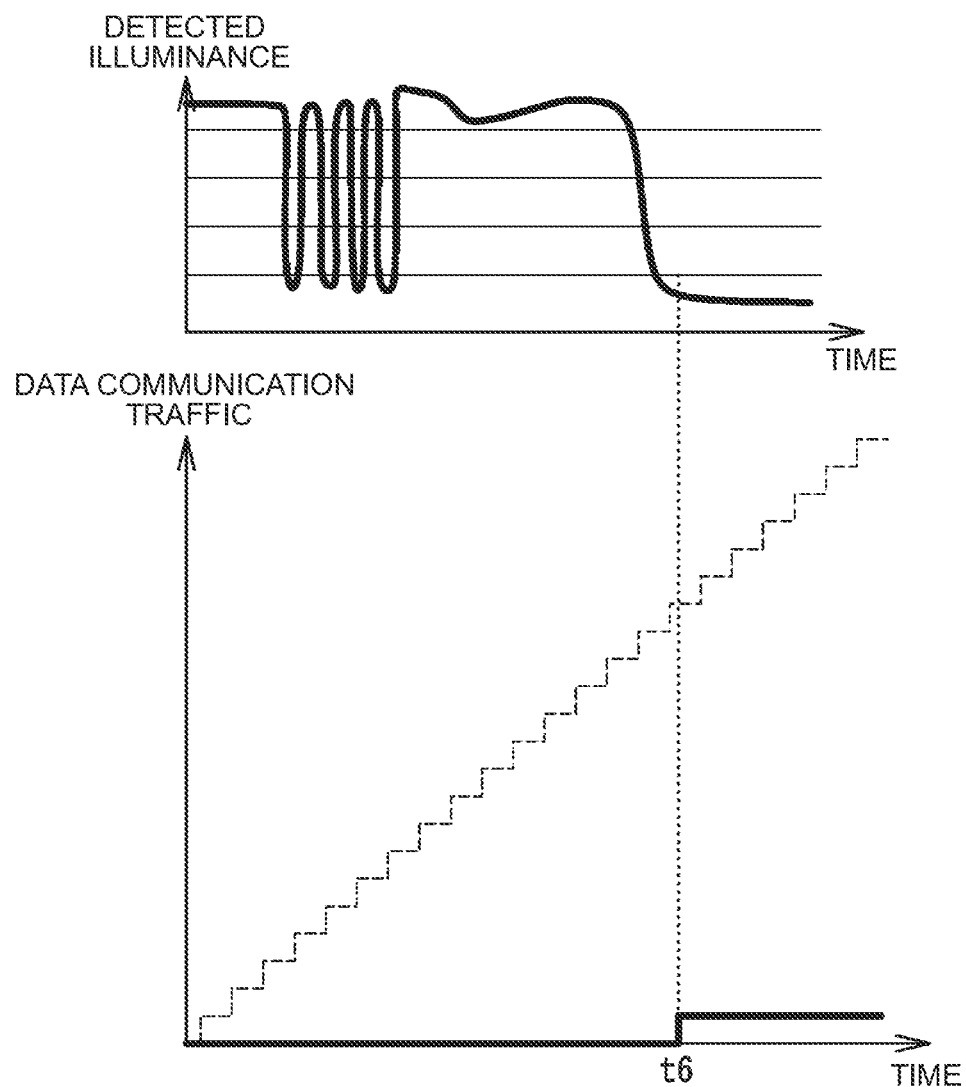
FIG. 8 is a graph showing a comparison between data communication traffic in a periodic transmission mode and data communication traffic in an embodiment.

Incidentally, in the present embodiment, a detected illuminance Id is compared with the illuminance thresholds Th*, and crossing data is transmitted only at the timing at which a crossover phenomenon that the detected illuminance Id crosses any one of the illuminance thresholds Th* arises. However, a mode in which a detected illuminance Id is not compared with the illuminance thresholds Th* and a pair of detected illuminance Id and detected location Pd periodically obtained is periodically transmitted (hereinafter, periodic transmission mode) is also conceivable. FIG. 8 shows a comparison between data communication traffic in the periodic transmission mode and data communication traffic in the present embodiment.

In FIG. 8, the top graph shows a change in detected illuminance Id, and the bottom graph shows a change in data communication traffic. In the bottom graph of FIG. 8, the dashed line represents data communication traffic in the periodic transmission mode, and the continuous line represents data communication traffic in the present embodiment. As is apparent from FIG. 8, in the periodic transmission mode, data communication traffic increases in proportion to time. On the other hand, in the present embodiment, data is transmitted only at time t6 at which a crossover phenomenon occurs. As a result, it is found that the total data communication traffic is significantly reduced as compared to the periodic transmission mode.

Incidentally, a sunshine map 40 is mostly used to identify an area suitable for photovoltaic power generation or an area not suitable for photovoltaic power generation. As in the case of the period from time t0 to time t1 in FIG. 6, a fluctuation area in which bright and dark situations frequently switch is not suitable for photovoltaic power generation. However, in the flowchart of FIG. 7, no data for the boundary of the fluctuation area is transmitted, and the management apparatus 14 is not able to learn the boundary of the fluctuation area not suitable for photovoltaic power generation. For this reason, in addition to crossing data, data indicating the boundary of the fluctuation area may also be transmitted.

Specifically, when such illuminance fluctuations that a crossover phenomenon frequently occurs over a prescribed default frequency arises, the controller 22 may transmit, to the management apparatus 14, fluctuation area data, including a fluctuation start location Ps that is a detected location Pd at the start of the fluctuations and a fluctuation end location Pe that is a detected location Pd at the end of the fluctuations. According to the example of FIG. 6, the controller 22 transmits, to the management apparatus 14 at time t2, fluctuation area data, including a fluctuation start location Ps that is a detected location Pd at time t0 and a fluctuation end location Pe that is a detected location Pd at time t1.

Figure 9:
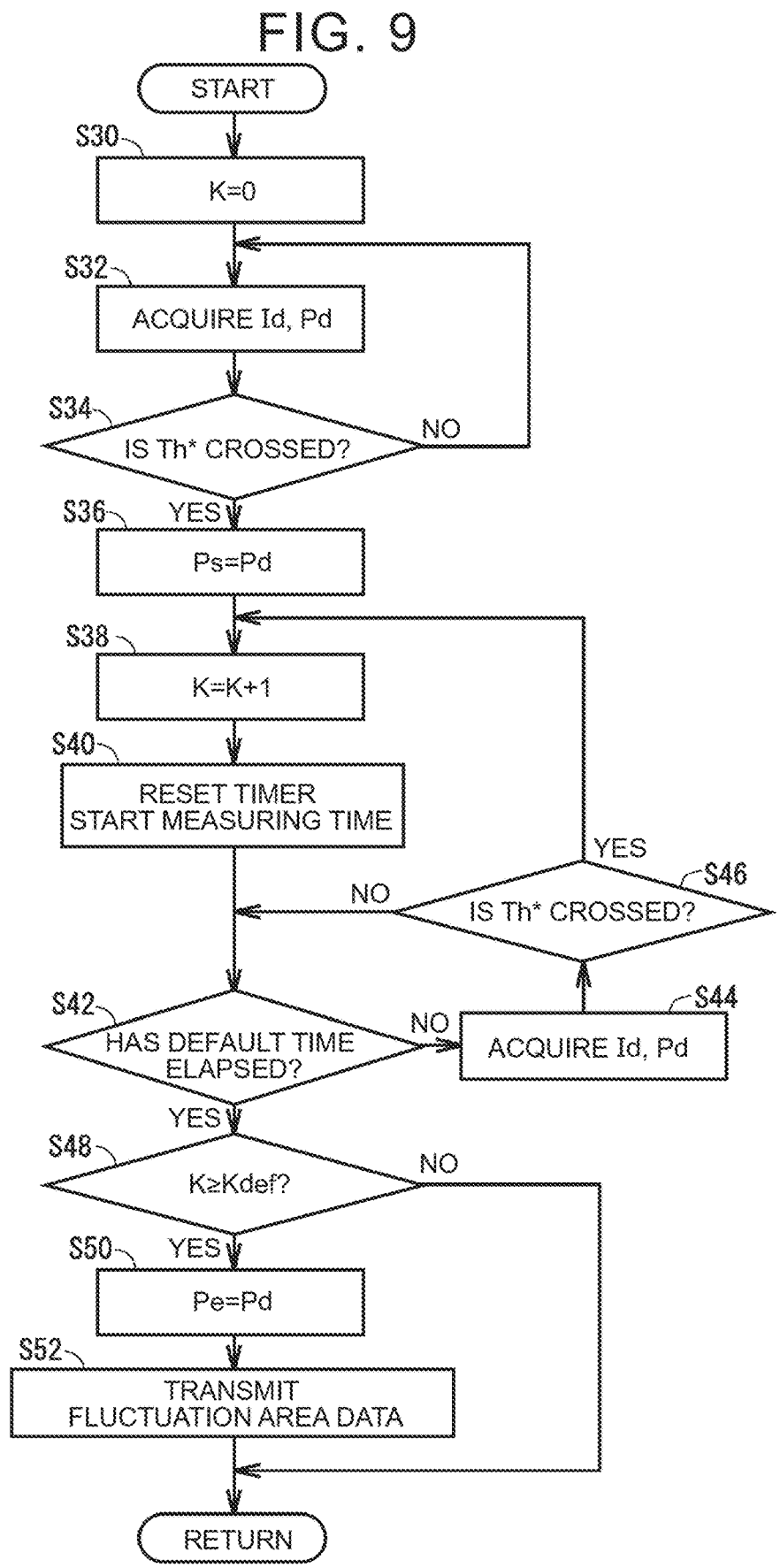
FIG. 9 is a flowchart showing the flow of a process of transmitting fluctuation area data.

FIG. 9 is a flowchart showing the flow of a process of transmitting fluctuation area data. The controller 22 may execute the flowchart of FIG. 9 in parallel with the flowchart of FIG. 7. When the controller 22 transmits fluctuation area data, the controller 22 initially resets a parameter K indicating the number of times a crossover phenomenon has occurred (S30). Subsequently, the controller 22 acquires the detected illuminance Id and the detected location Pd (S32) and determines whether there is a crossover phenomenon (S34). When there is a crossover phenomenon (Yes in S34), the controller 22 temporarily stores the latest detected location Pd in the storage device 34 as a fluctuation start location Ps (S36) and increments the parameter K (S38).

Subsequently, the controller 22 resets the timer and starts measuring a time (S40). When the measured time does not reach the default time Tdef (No in S42), the controller 22 acquires a detected location Pd and a detected illuminance Id again (S44) and determines whether there is a crossover phenomenon (S46). Each time the controller 22 determines that there is a crossover phenomenon (Yes in S46), the controller 22 increments the parameter K (S38) and resets the timer (S40).

On the other hand, when the controller 22 does not determine in step S46 that there is a crossover phenomenon, the controller 22 proceeds to step S42 without incrementing the parameter K or resetting the timer. Finally, when the measured time exceeds the default time Tdef (Yes in S42), the controller 22 compares the parameter K with a prescribed default value Kdef. The default value Kdef is not limited as long as the default value Kdef is an integer greater than or equal to two. When the default value Kdef is set to a value less than or equal to the number of the illuminance thresholds Th* ("4" in the example of FIG. 6), a place where the detected illuminance Id steeply decreases or steeply increases as in the case of the period from time t4 to time t5 in FIG. 6 can also be detected as a fluctuation area. To avoid such an inconvenience, the default value Kdef just needs to be greater than or equal to the number of the illuminance thresholds Th*.

As a result of the comparison, when the parameter K, that is, the number of times a crossover phenomenon has occurred, is less than the default value Kdef (No in S48), the controller 22 returns to step S30 without transmitting data. On the other hand, when the parameter K is greater than or equal to the default value Kdef (Yes in S48), the controller 22 temporarily stores the latest detected location Pd in the storage device 34 as a fluctuation end location Pe (S50). The controller 22 transmits, to the management apparatus 14, the fluctuation area data, including the fluctuation start location Ps obtained in step S36 and the fluctuation end location Pe obtained in step S50 (S52).

In accordance with the flowchart of FIG. 9, as in the case of the period from time t0 to time t1 in FIG. 6, the boundary locations of a fluctuation area where the illuminance frequently fluctuates, that is, fluctuation area data including a fluctuation start location Ps and a fluctuation end location Pe, is transmitted to the management apparatus 14. With this configuration, the management apparatus 14 is able to incorporate a fluctuation area not suitable for photovoltaic power generation in a sunshine map 40. As a result, the management apparatus 14 is able to further highly accurately calculate a route along which photovoltaic power generation is efficiently performed.

In the flowcharts of FIG. 7 and FIG. 9, after a crossover phenomenon occurs, measurement of a time is started (S18, S40), and whether the default time Tdef has elapsed is monitored (S20, S42). Instead of determination based on time, determination based on the travel distance of the vehicle 100 may be performed. In other words, in step S18 of FIG. 7 or step S40 of FIG. 9, measurement of travel distance, instead of time, may be started, and whether the travel distance has reached a prescribed default distance may be monitored in step S20 or step S42.

Incidentally, a crossover phenomenon frequently occurs around the boundary between two areas divided by illuminance level L*. For example, around the area Ea in FIG. 5, it is estimated that a crossover phenomenon to exceed the illuminance threshold Th4 and a crossover phenomenon to fall below the illuminance threshold Th4 frequently occur. In such a case, it is not appropriate to recognize the place around the boundary not as a boundary and as a fluctuation area. To ignore fluctuations in illuminance around a boundary, a predetermined hysteresis width may be provided for the illuminance thresholds Th*.

Figure 10:
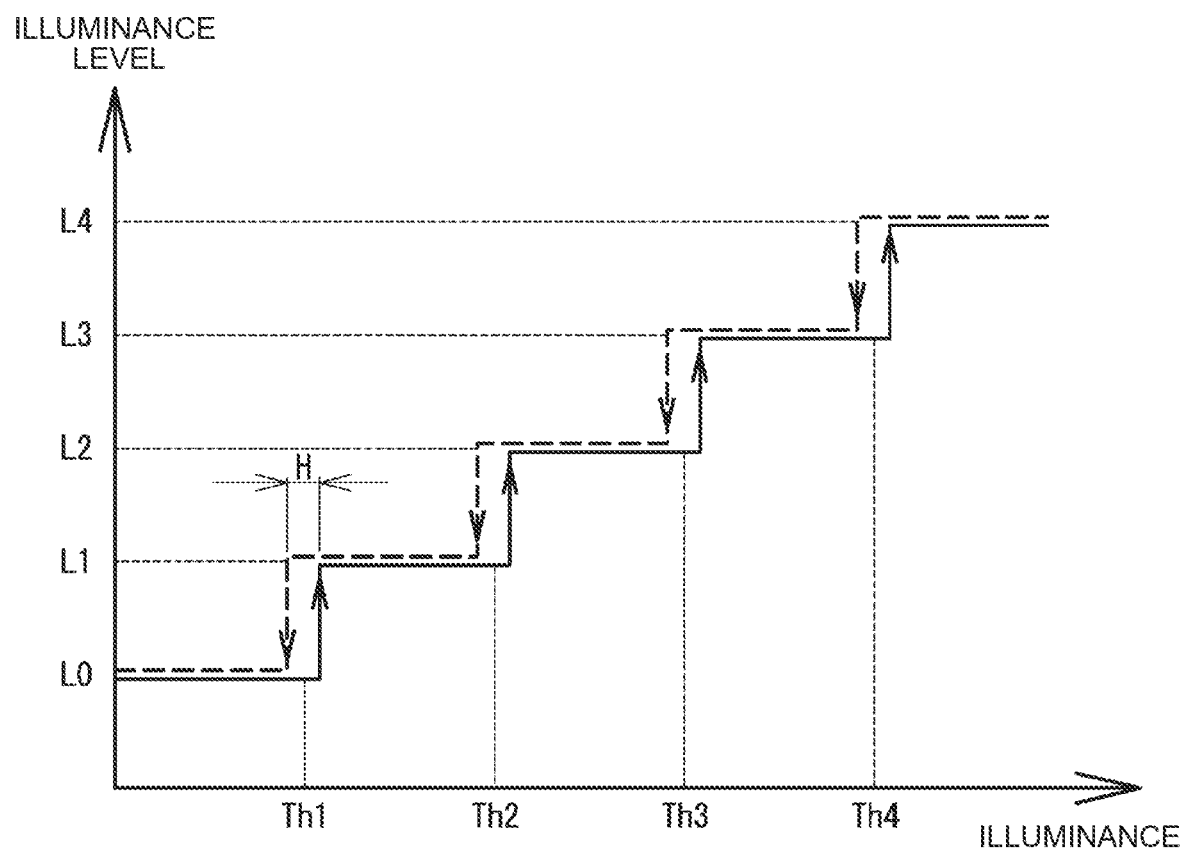
FIG. 10 is a graph showing examples of illuminance thresholds when hysteresis width H is provided.

FIG. 10 is a graph showing examples of illuminance thresholds when hysteresis width H is provided. In FIG. 10, the continuous lines represent illuminance thresholds that are employed when the illuminance changes in an upward direction, and the dashed lines represent illuminance thresholds when the illuminance changes in a downward direction.

As shown in FIG. 10, when the illuminance changes in an upward direction, values obtained by adding H/2 to the reference illuminance thresholds Th1, Th2, Th3, Th4 are used as illuminance thresholds. When the illuminance changes in a downward direction, values obtained by subtracting H/2 from the reference illuminance thresholds Th1, Th2, Th3, Th4 are used as illuminance thresholds. With the above configuration, a phenomenon that the detected illuminance Id minutely fluctuates around one illuminance threshold Th* is ignored.

In the foregoing description, data is transmitted from the illuminating apparatus 12 to the management apparatus 14 at the timing at which a crossover phenomenon occurs. However, data of illuminance (that is, illuminance data) may be transmitted at other timing as long as transmission of data does not apply a load on the illuminating apparatus 12.

For example, after the controller 22 transmits illuminance data to the management apparatus 14, when a prescribed standby time Twt elapses or intermediate report timing at which the vehicle 100 has travelled a prescribed standby distance Lwt is reached without new data transmission, the controller 22 may transmit intermediate data that is a type of illuminance data to the management apparatus 14 even when no crossover phenomenon occurs. Intermediate data includes, for example, a detected location Pd at intermediate report timing and a representative value of detected illuminances Id obtained by the intermediate report timing or a detected illuminance Id at the intermediate report timing. Here, a representative value of detected illuminances Id is a value that represents a plurality of detected illuminances Id obtained from last data transmission by the intermediate report timing and is, for example, an average value, a median value, a modal value, or the like.

Figure 11:
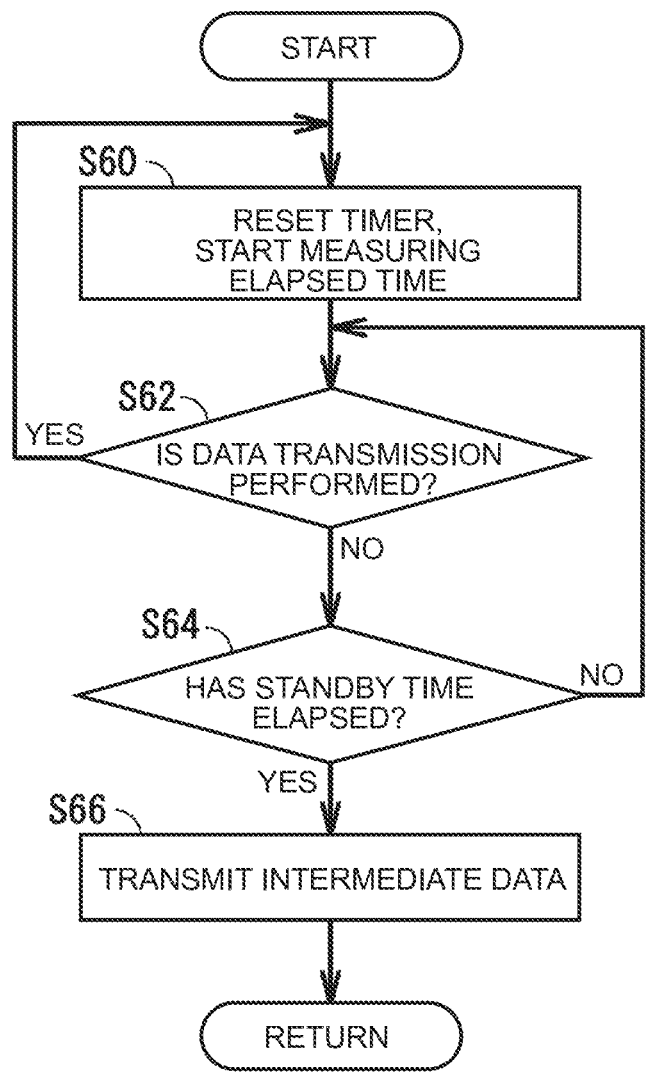
FIG. 11 is a flowchart showing the flow of a process of transmitting intermediate data.

FIG. 11 is a flowchart showing the flow of a process of transmitting intermediate data. The flowchart of FIG. 11 is executed in parallel with the flowchart of FIG. 7. The controller 22 initially resets the timer and starts measuring an elapsed time (S60). After the start of measurement, when data of illuminance, that is, any one of crossing data, fluctuation area data, and intermediate data, is transmitted from the controller 22 to the management apparatus 14 (Yes in S62), the controller 22 returns to step S60, resets the timer, and then starts measuring an elapsed time again. On the other hand, when the elapsed time reaches the standby time Twt without data transmission (No in S62 and Yes in S64), the controller 22 transmits, to the management apparatus 14, intermediate data, including information indicating a detected location Pd at that time point and information indicating a detected illuminance Id (S66). In this way, when no data transmission has been performed for a long time, data of illuminance is transmitted even when there is no crossover phenomenon. Thus, a sunshine map 40 is further highly accurately generated.

In the flowchart of FIG. 11, the timing at which the standby time Twt has elapsed from the last data transmission is defined as intermediate report timing, and intermediate data includes a detected illuminance Id at the time of intermediate report. However, of course, in the flowchart of FIG. 11, the timing at which the vehicle 100 has travelled a standby distance Lwt may be used as intermediate report timing, and intermediate data may be changed so as to include a representative value of a plurality of detected illuminances Id obtained by intermediate report.

Crossing data, fluctuation area data, and intermediate data described above each include information on an illuminance and a location. However, crossing data, fluctuation area data, and intermediate data each may further include information indicating a travel route of the vehicle 100 in addition to information on an illuminance and a location.

Figure 12:
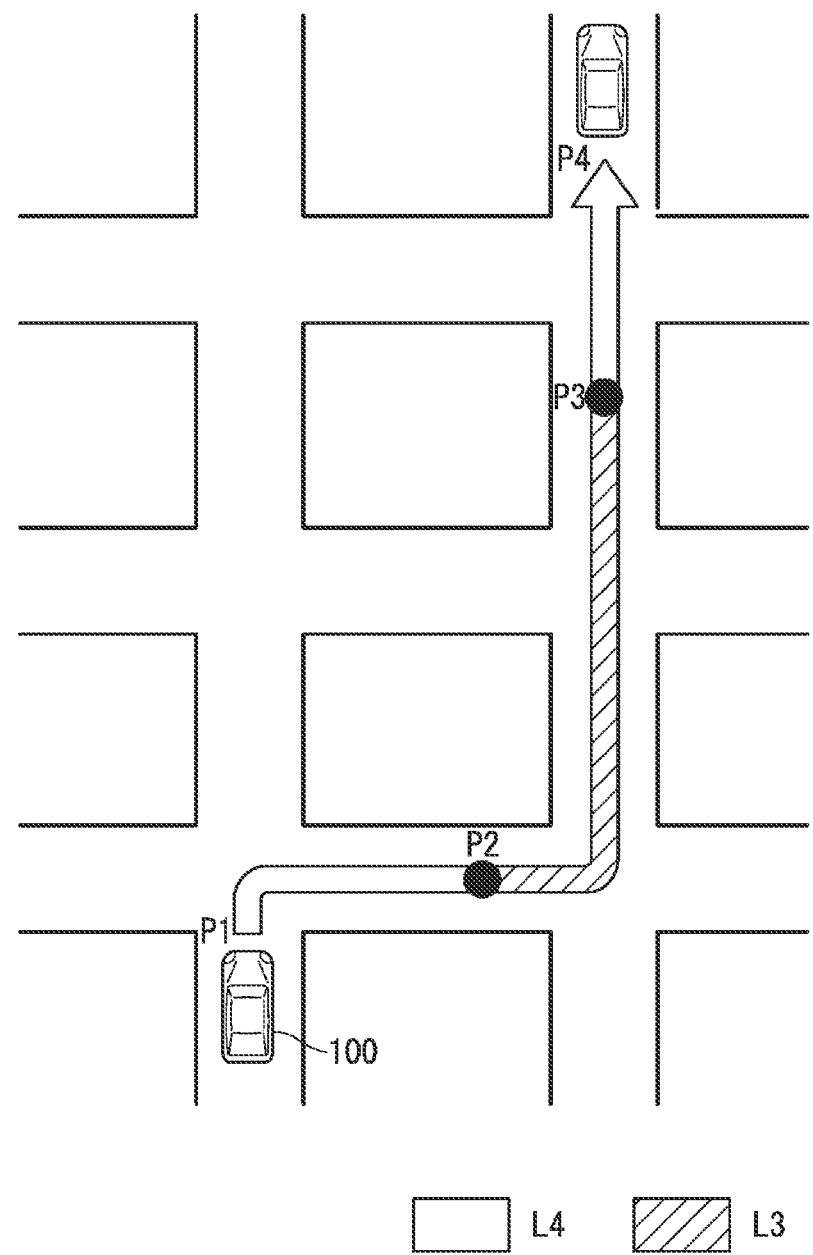
FIG. 12 is a view showing an example of a travel route of a vehicle.

It is assumed that, for example, the vehicle 100 travels from location P1 in FIG. 12 via location P2 and location P3 to location P4. In the example of FIG. 12, the illuminance level is L4 from location P1 to location P2, the illuminance level is L3 from location P2 to location P3, and the illuminance level is L4 from location P3 to location P4. Therefore, at each of location P2 and location P3, a crossover phenomenon occurs, and crossing data is transmitted. The crossing data may include information on a travel route of the vehicle 100 in addition to information on a location and an illuminance at each of location P2 and location P3. In other words, crossing data to be transmitted at location P2 may include information indicating a travel route from location P1 to location P2, and crossing data to be transmitted at location P3 may include information indicating a travel route from location P2 to location P3. With the above configuration, the management apparatus 14 understands that the illuminance level is L4 on a path from location P1 to location P2 and the illuminance level is L3 on a path from location P2 to location P3. Thus, the accuracy of the sunshine map 40 is further improved.

A detected result of the raindrop sensor 20 may be further transmitted in addition to a crossing location Pt and a crossing threshold Tht as crossing data. The raindrop sensor 20 is a sensor that detects whether there are raindrops on the windshield as described above. By transmitting a detected result of the raindrop sensor 20, the management apparatus 14 is able to estimate the cause of occurrence of a crossover phenomenon to some extent. In other words, the cause of occurrence of a crossover phenomenon that the detected illuminance Id crosses any one of the illuminance thresholds Th* includes the motion of the sun that moves with a lapse of time, a shield that causes a shade, and a change of weather. Of these, the motion of the sun can be determined from time at which crossing data is transmitted. When a detected result of the raindrop sensor 20 is transmitted to the management apparatus 14, the management apparatus 14 is able to determine to some extent whether a change of weather has occurred. Thus, it is possible to estimate the cause of a crossover phenomenon as any one of the motion of the sun, a shield, and weather to some extent. The estimated result can be used to generate a sunshine map 40 in the future, so the accuracy of the sunshine map 40 is improved.

In the foregoing description, data indicating the boundary points of areas divided by illuminance level L* is transmitted to the management apparatus 14 as crossing data. In this embodiment, when the number of the illuminating apparatuses 12 and, by extension, the vehicles 100, is large, a large number of boundary points are obtained as shown in FIG. 4, so the boundary lines of areas are obtained by connecting these points. However, when the number of the illuminating apparatuses 12 and, by extension, the vehicles 100, is small, the number of the boundary points obtained reduces, so it is difficult to learn the boundary lines of areas. In this way, when the illuminating apparatuses 12 are small in number, not only information indicating boundary points but also other information is required to be transmitted.

For this reason, each of the illuminating apparatuses 12 may be configured to switch its operation mode according to the density of the illuminating apparatuses 12 including itself. For example, the illuminating apparatus 12 each may have a first mode to transmit crossing data according to a compared result between a detected illuminance Id and the illuminance thresholds Th* and a second mode to transmit a larger amount of data of illuminance as compared to the first mode, as its operation mode. Specific details of the first mode and the second mode may be changed as needed. For example, the second mode may be a mode to increase the number of times of transmission as compared to the first mode. In another embodiment, the second mode may be a mode in which the amount of data to be transmitted each time is larger than that of the first mode.

FIG. 13 is a table showing an example of a combination of the first mode and the second mode. As in the case of a first combination of FIG. 13, in the first mode, a crossing location Pt and a crossing threshold Tht may be transmitted as crossing data at the timing of crossing any one of the illuminance thresholds Th*, and in the second mode, a detected location Pd and a crossing threshold Tht may be transmitted at each sampling timing shorter than the default time Tdef. As in the case of a second combination of FIG. 13, crossing data may be transmitted at the timing of crossing any one of the illuminance thresholds Th* in any of the first mode and the second mode, and in the second mode, a travel route may be further transmitted as crossing data in addition to a crossing location Pt and a crossing threshold Tht.

When each of the illuminating apparatuses 12 estimates that the density of the illuminating apparatuses 12 including itself is sufficiently high, the illuminating apparatus 12 may be configured to operate in the first mode, and, when each f the illuminating apparatuses 12 estimates that the density of the illuminating apparatuses 12 is not sufficiently high, the illuminating apparatus 12 may be configured to operate in the second mode. The density of the illuminating apparatuses 12 may be determined based on at least one of a time period, a place, and an instruction from the management apparatus 14. For example, the density of the illuminating apparatuses 12 can be estimated to be low in the early morning when the amount of activity of people is small and can be estimated to be high in a commute time period in which commute vehicles are large in number. Alternatively, the density of the illuminating apparatuses 12 can be estimated to be high in urban areas where the number of the vehicles 100 is large and can be estimated to be low in a countryside. Therefore, each of the illuminating apparatuses 12 is able to estimate the density of the illuminating apparatuses 12 from a time period or a vehicle location to some extent. Since each of the illuminating apparatuses 12 communicates with the illuminating apparatuses 12, the illuminating apparatus 12 is able to highly accurately determine the density of the illuminating apparatuses 12 in each place. For this reason, the management apparatus 14 may determine the density of the illuminating apparatuses 12 and provide an instruction on the operation mode according to the density to each illuminating apparatus 12.

With the above configuration, depending on a situation, data required to generate a sunshine map 40 is transmitted. In the foregoing description, only the first mode and the second mode are described as the operation modes; however, the illuminating apparatus 12 may have a further larger number of operation modes. For example, the illuminating apparatus 12 may have a first mode to transmit a crossing location Pt and a crossing threshold Tht at the timing of crossing any one of the illuminance thresholds Th*, a second mode to further transmit a travel route in addition to a crossing location Pt and a crossing threshold Tht at the same timing as the first mode, and a third mode to transmit a detected illuminance Id and a detected location Pd at each sampling timing.

The configuration described above is one example, and the configuration may be changed as needed as long as the controller 22 of the illuminating apparatus 12 transmits, to the management apparatus 14, crossing data, including information indicating a detected location Pd when a crossover phenomenon occurs and information indicating a detected illuminance Id when a crossover phenomenon occurs. For example, in the foregoing description, four illuminance thresholds Th* are provided; however, the number of illuminance thresholds Th* is not limited as long as the number of illuminance thresholds Th* is one or more. When a crossover phenomenon occurs, the illuminating apparatus 12 may immediately transmit crossing data without waiting a lapse of the default time Tdef.

What is claimed is:

1. An illuminating apparatus comprising:
    an illuminance sensor mounted on a vehicle and configured to detect an illuminance outside the vehicle as a detected illuminance;
    a location sensor mounted on the vehicle and configured to detect a location of the vehicle as a detected location; and
    a controller configured to store one or more illuminance thresholds that are thresholds of the illuminance and monitor whether there is a crossover phenomenon that the detected illuminance crosses one of the one or more illuminance thresholds, the controller being configured to transmit crossing data, including information indicating the detected location when the crossover phenomenon occurs and information indicating the detected illuminance when the crossover phenomenon occurs, to a management apparatus outside the vehicle.

2. The illuminating apparatus according to claim 1, wherein:
    the controller is configured to transmit the crossing data to the management apparatus when no new crossover phenomenon occurs until a prescribed default time elapses or until the vehicle travels a prescribed default distance, after the crossover phenomenon occurs; and
    the controller is configured not to transmit the crossing data to the management apparatus when a new crossover phenomenon occurs before the default time elapses or before the vehicle travels the default distance, after the crossover phenomenon occurs.

3. The illuminating apparatus according to claim 1, wherein, when illuminance fluctuations that the crossover phenomenon frequently occurs over a prescribed default frequency arise, the controller is configured to transmit, to the management apparatus, fluctuation data, including a fluctuation start location that is the detected location at a start of the illuminance fluctuations and a fluctuation end location that is the detected location at an end of the illuminance fluctuations.

4. The illuminating apparatus according to claim 1, wherein the controller is configured to, after transmitting data of illuminance to the management apparatus, a prescribed standby time elapses or intermediate report timing at which the vehicle has travelled a prescribed standby distance is reached without newly transmitting data, transmit, to the management apparatus, the detected location at a time point of the intermediate report timing and a representative value of the detected illuminance obtained before the intermediate report timing or the detected illuminance at the time point of the intermediate report timing.

5. The illuminating apparatus according to claim 1, further comprising a raindrop sensor mounted on the vehicle and configured to detect a raindrop on a windshield, wherein the crossing data includes a detected result of the raindrop sensor when the crossover phenomenon occurs.

6. The illuminating apparatus according to claim 1, wherein the crossing data further includes a travel route of the vehicle from when the crossover phenomenon occurs last time to when the crossover phenomenon occurs current time.

7. The illuminating apparatus according to claim 1, wherein:
    the controller is configured to operate in one operation mode selected according to a situation from among a plurality of operation modes; and
    the plurality of operation modes includes a first mode in which the controller transmits the crossing data when the crossover phenomenon occurs and a second mode in which the controller transmits a larger amount of data of illuminance than in the first mode.

8. The illuminating apparatus according to claim 1, wherein the controller is configured to select one operation mode from among a plurality of operation modes based on at least one of a time period, a vehicle location, and an instruction from the management apparatus.

9. An illuminance collection system comprising:
    a plurality of illuminating apparatuses respectively mounted on vehicles; and
    a management apparatus configured to manage data of illuminance, transmitted from the plurality of illuminating apparatuses, wherein:
    each of the illuminating apparatuses includes
        an illuminance sensor mounted on a vehicle and configured to detect an illuminance outside the vehicle as a detected illuminance,
        a location sensor mounted on the vehicle and configured to detect a location of the vehicle as a detected location, and
        a controller configured to store one or more illuminance thresholds that are thresholds of the illuminance and monitor whether there is a crossover phenomenon that the detected illuminance crosses one of the one or more illuminance thresholds, the controller being configured to transmit crossing data, including information indicating the detected location when the crossover phenomenon occurs and information indicating the detected illuminance when the crossover phenomenon occurs, to the management apparatus.

10. The illuminance collection system according to claim 9, wherein the management apparatus is configured to perform mapping by classifying the detected locations included in the crossing data by the one or more crossed illuminance thresholds and generate a sunshine map divided according to illuminance level by connecting the detected locations associated with the same one of the one or more illuminance thresholds.

* * * * *